United States Patent Office 3,822,160
Patented July 2, 1974

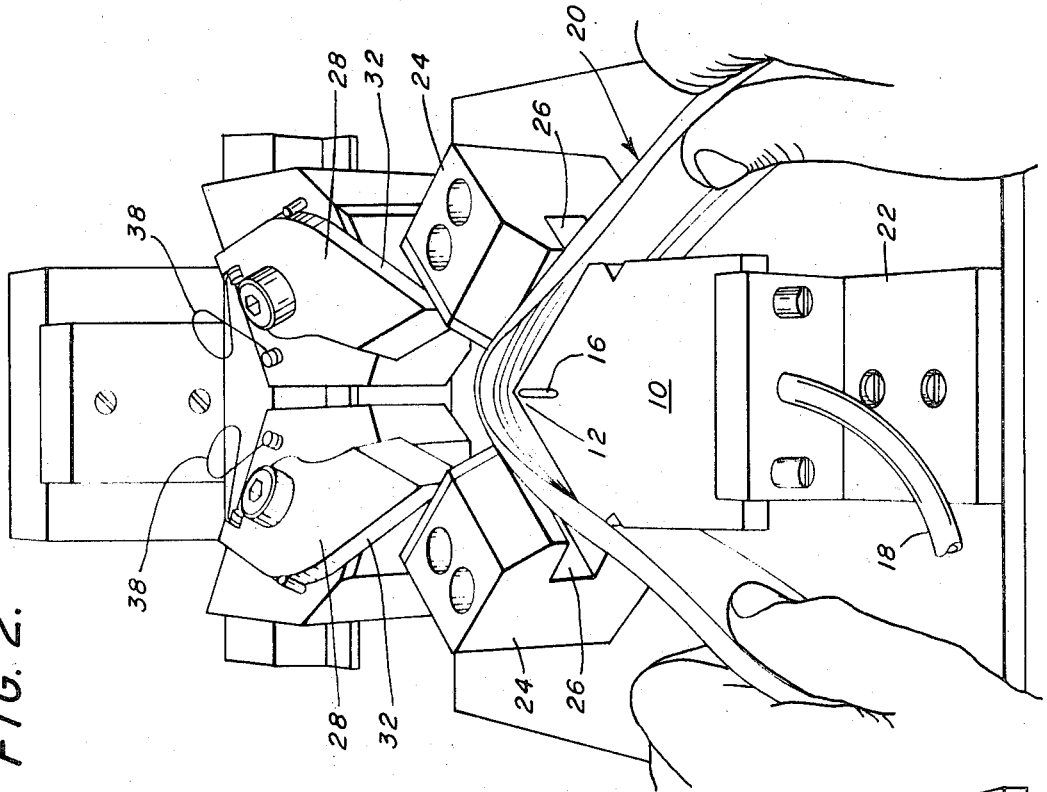
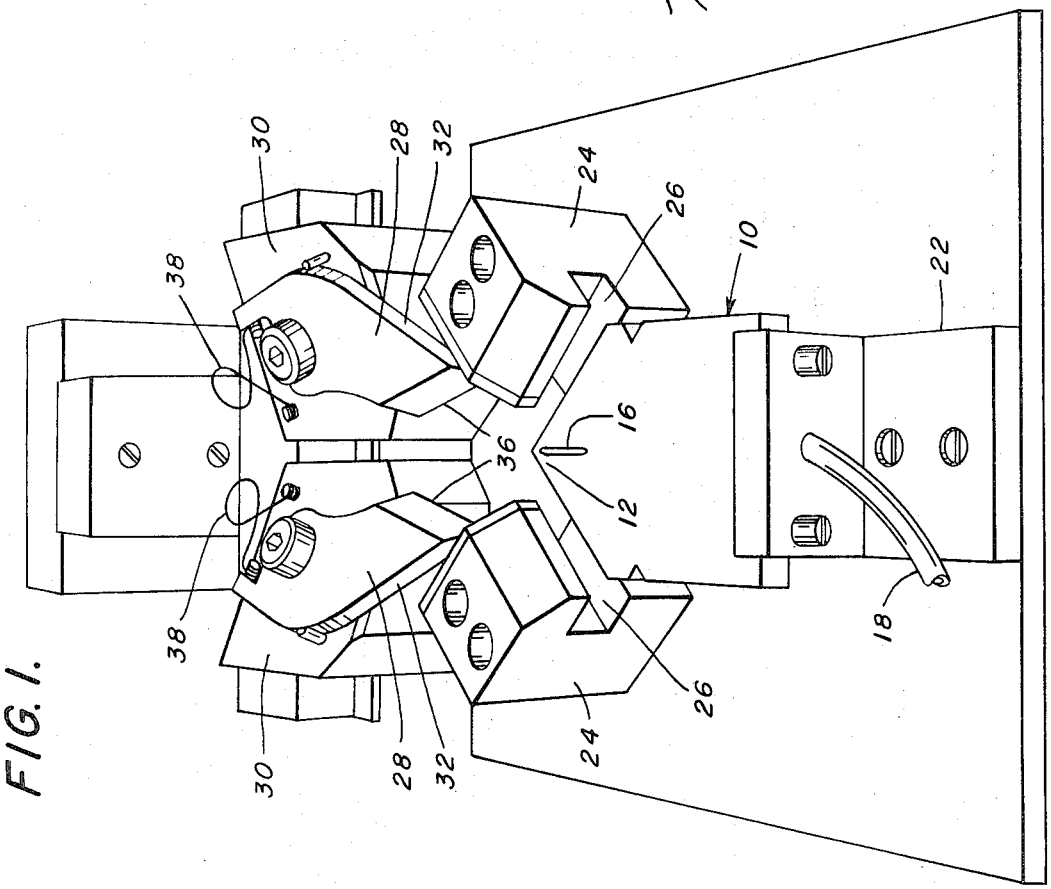

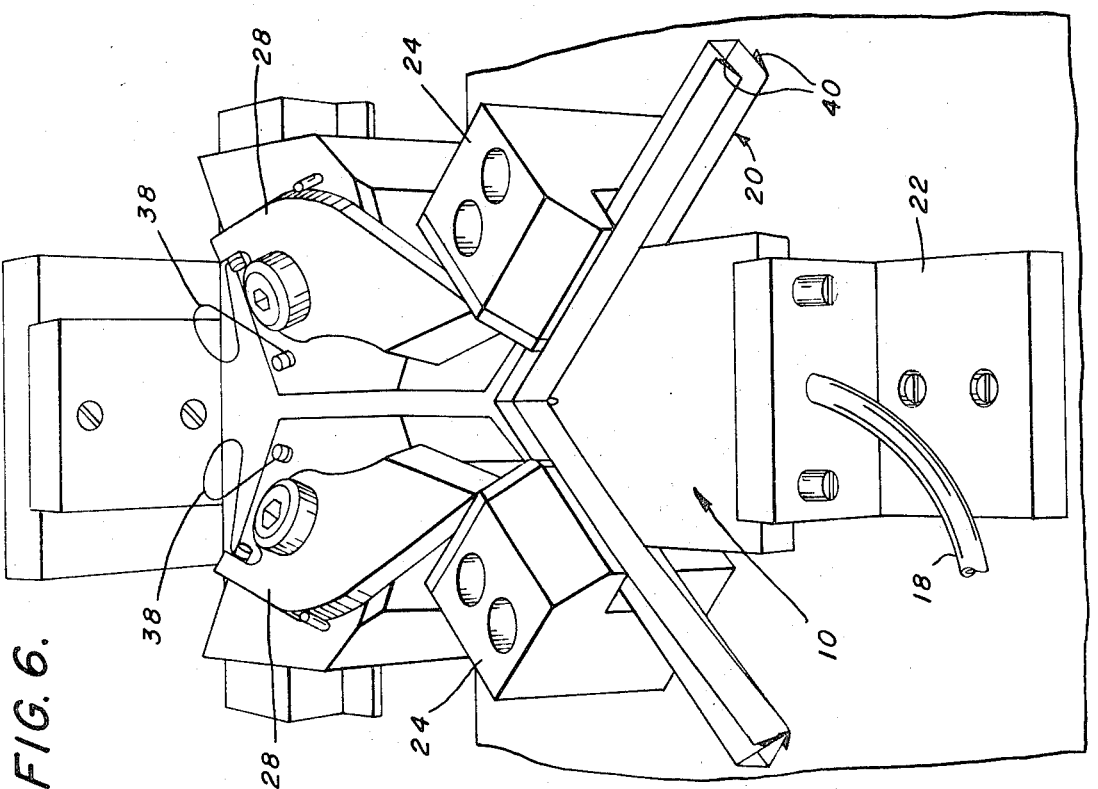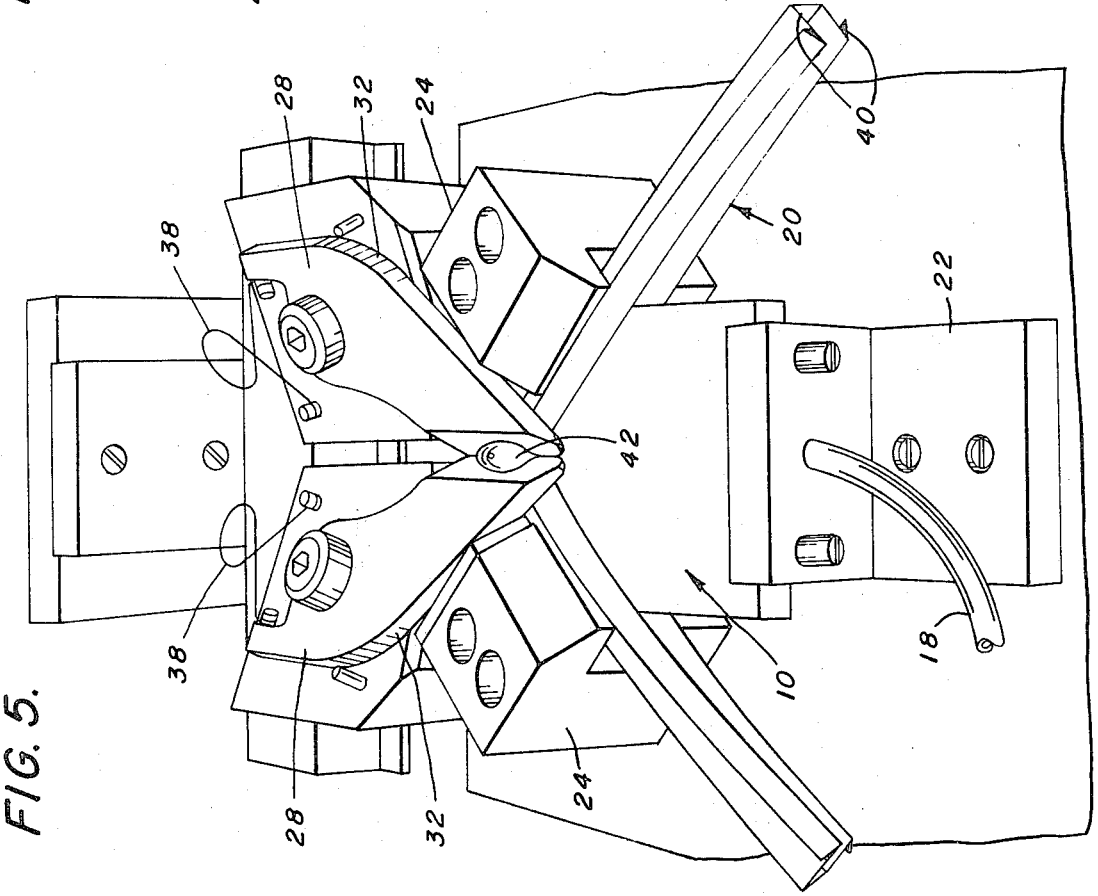

3,822,160
METHOD AND APPARATUS FOR FORMING A MITERED CORNER IN A FLEXIBLE ELASTOMERIC STRIP
Robert L. La Barge, Ben Avon, and Russell G. Painter, Arnold, Pa., assignors to Aluminum Company of America, Pittsburgh, Pa.
Filed May 30, 1972, Ser. No. 257,964
Int. Cl. B29c 17/02, 17/08
U.S. Cl. 156—212                          7 Claims

ABSTRACT OF THE DISCLOSURE

Apparatus and a method for forming a mitered corner in an unnotched channel-shaped strip of flexible elastomeric material are provided wherein such a strip is positioned over a mandrel having a contoured portion on it in the shape of the mitered corner to be formed, the mandrel is moved against support blocks to form a bend in the strip and a loop in the side flange of the strip, hot air is forced against inside surfaces of the loop to heat the elastomeric material to a plastic adhesive state, and blades are closed against the loop of material to weld abutting surfaces together and thereafter sever excess material from the welded corner at completion of the closing of the blades.

BACKGROUND OF THE INVENTION

Forming mitered corners elastomer strip as in U-shaped channel strips which may be used to seal the peripheral edges of glazing panels in windows or the like has heretofore usually been accomplished by slow processes which have included several manual operations. The elastomeric strips of this type have usually been extruded in a continuous form, cut to the length, notched or trimmed so that the flanges will meet at an appropriate angle, and the ends pressed together and heated for a few seconds to bond them together. An example of such a method of forming mitered joints is disclosed in U.S. Pat. No. 2,886,482. Other methods of making mitered joints in elastomeric materials are disclosed in U.S. Pat. Nos. 2,794,221 and 2,503,882. It is also known to form corners in a metal bar by cutting a notch in a flange on the bar and then placing the bar in a clamping device which bends it and electrically heats the coincident edges of the flange to weld them together as is disclosed in U.S. Pat. No. 1,071,490. A method and apparatus are desired which will facilitate relatively high speed production of mitered corners in flexible strips of elastomeric materials.

SUMMARY OF THE INVENTION

This invention relates to apparatus for forming a mitered corner in an elastomeric strip including a mandrel, a source of heated air, means for clamping an elastomeric strip on the mandrel in the desired corner shape and blades for closing a loop of elastomer material on the corner of the strip to weld abutting surfaces which have been heated to an adhesive state and thereafter sever excess material from the strip at completion of closing of the blades. A method of forming a mitered corner using such apparatus is also provided.

An object of the invention is to provide a relatively high speed method of forming a mitered corner joint in a strip of flexible elastomeric materials.

Another object of the invention is to provide apparatus for forming a mitered joint in a strip of flexible elastomeric material.

BRIEF DESCRIPTION OF THE DRAWINGS

The above and other objects and advantages of the invention will be more fully understood and appreciated with reference to the following description and the drawings apended hereto wherein:

FIG. 1 is a perspective view of apparatus of the invention,

FIG. 2 is a view similar to FIG. 1 illustrating placement of a channel-shaped elastomeric strip on the mandrel in the apparatus, FIG. 5 is a view similar to the previous figures illustrating pressing the neck of the loop together and severing excess material from the corner of the strip, and FIG. 6 is a view similar to the previous figures illustrating the elastomeric strip on the mandrel after the blades have been opened, showing the mitered corner which has been formed in the strip.

DESCRIPTION OF A PREFERRED EMBODIMENT AND MODE

Figure 4:
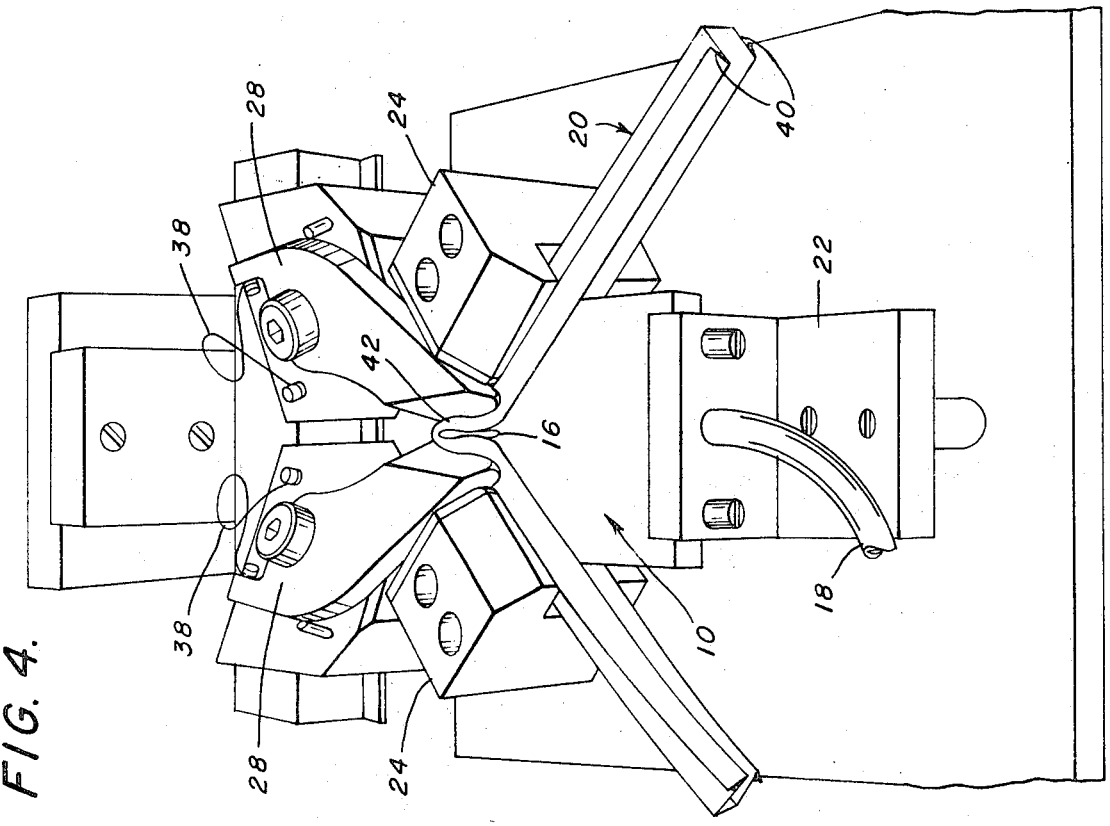
FIG. 4 is a view similar to the previous figures illustrating forming a loop in the corner of the elastomeric strip.

The drawings attached hereto show apparatus for forming a corner in a channel-shaped strip of flexible elastomeric material including a mandrel made of low thermal conductance material having a nose end in the shape of a mitered corner to be formed, support blocks for clamping an elastomeric strip on the mandrel, a source of hot air to heat the portions of the strip which are to be welded, and blades for closing a loop on one leg of the channel-shaped strip to weld abutting surfaces and thereafter sever excess material from the strip, thus forming a welded corner in the strip. The apparatus which has been selected for illustration is specifically designed to form a mitered corner in a channel or U-shaped strip of vinyl or like material which will parametrically frame a glazing panel for a window or the like. Vinyl sealing strips of this type are typically extruded in a continuous length and subsequently shaped to fit the four edges of a glazing panel. The present invention provides a faster method and apparatus for shaping such a strip to fit a panel.

For purposes of simplicity of illustration and description, apparatus is shown for cutting and welding a flange or leg on only one side of such a channel-shaped sealing strip member. However, a preferred embodiment of apparatus of the invention includes means for simultaneously cutting and welding the flanges on both sides of such a channel-shaped sealing strip member. Such preferred apparatus requires only an additional set of blades for welding and cutting and the flange on the opposite side to that illustrated in the drawings. The mandrel and clamping blocks illustrated in the drawings may be adapted to serve in forming a corner weld in both flanges as will be explained. Further, the apparatus which has been selected for illustration is adapted to form a 90° mitered corner in a sealing strip. However, it will be apparent to those skilled in the art that apparatus of the invention can be used to form almost any degree of corner angle that may be desired.

In the preferred embodiment of the invention illustrated in the drawings, mandrel 10 is made of a material having a relatively low thermal conductance such as a hardpressed, heavy board made from asbestos and portland cement sold under the trademark Transite, or other like material. Employment of a mandrel made of such material prevents heating of the surfaces of the mandrel to a high temperature which could soften elastomeric material of a gasket or sealing strip and cause the gasket to stick to the mandrel surfaces. Mandrel 10 preferably has a thickness approximately equal to the width of the open channel in the gasket in which a corner is to be formed, and has an angular nose portion 12 over which the gasket is shaped. Nose 12 may have an included angle of approximately 120° between its opposite edges 14 although the gasket corner is to seal a 90° corner on a panel. It has been found that forming a gasket over a mandrel nose with a 120° included angle helps to assure that sufficient material remains in the welded flanges so that the welds are not pulled apart when the gasket is stretched over a 90° corner on a panel.

An elongated aperture 16 is provided in nose portion 12 of mandrel 10 bisecting the included angle between opposing edges of the nose portion for escape of heated air to soften selected portions of a gasket positioned on the mandrel. Aperture 16 communicates with a source of heated air, not shown, via a passageway through the mandrel and a metal tube 18. When an elastomeric strip 20 is positioned on mandrel 10 and a loop of material is formed in the corner of the strip, aperture 16 underlies the opposing surfaces at the neck of the loop, as illustrated in FIG. 4, so that hot air escaping from the aperture will heat such opposing surfaces. In apparatus which is designed to cut and weld both flanges of a U-shaped strip, a similar aperture may be provided in the opposite face of mandrel 10 for heating opposing surfaces of the flange on the opposite side of a U-shaped sealing strip from that shown in the FIGS. 2–6.

Figure 3:
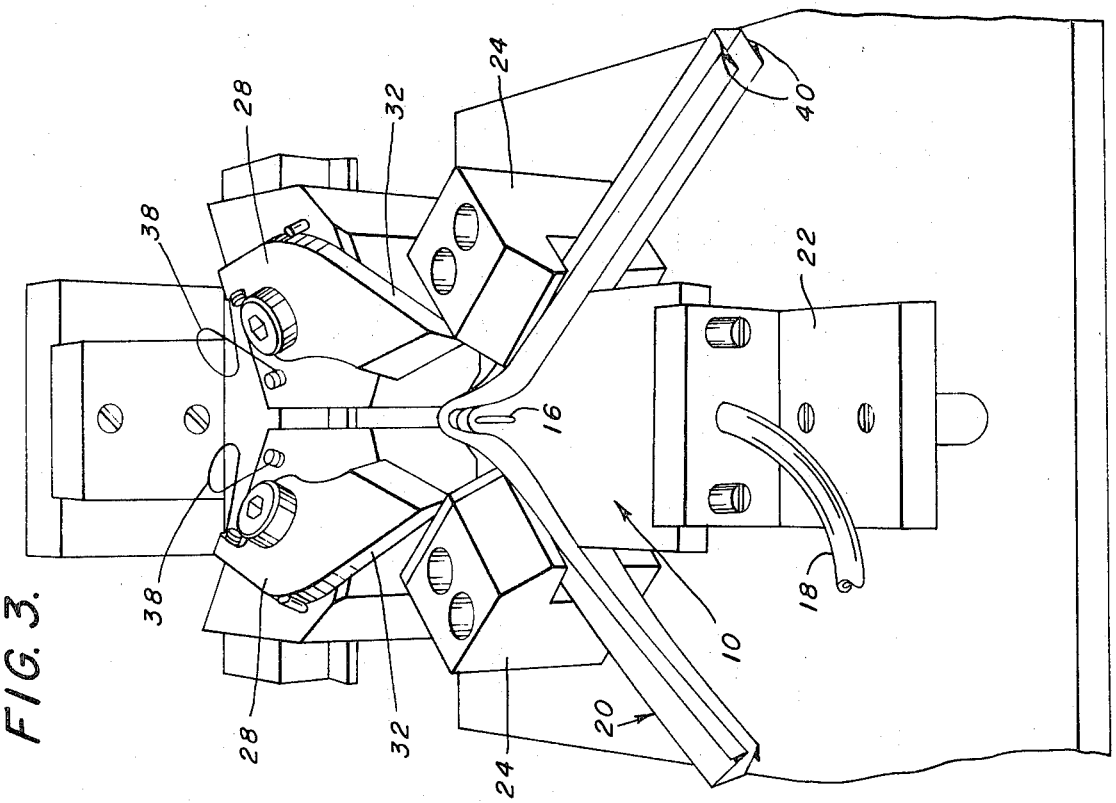
FIG. 3 is a view similar to FIGS. 1 and 2 illustrating clamping of the elastomeric strip on the mandrel.

Mandrel 10 may be mounted on an angle plate 22 which is preferably connected to actuating apparatus, not shown, which will move the mandrel in a line toward and away from two support blocks 24 for clamping a sealing strip 20 between the mandrel and the support blocks as illustrated in FIG. 3. Each support block 24 may have a groove 26 cut in it which substantially conforms to the outer shape of sealing strip 20 to securely clamp the strip against mandrel 10. As clamped, approximately a 120° bend is formed in sealing strip 20 preparatory to forming a mitered corner in the strip. Support blocks 24 may also be movable parallel to the line of movement of mandrel 10 for forming a corner in strip 20 as will be described.

Apparatus of the invention further includes a pair of blades 28 which are adapted to form a loop of material in sealing strip 20 at the bend which has been formed in the strip and cut excess material from the loop after the abutting surfaces of the loop have been welded together. In the embodiment selected for illustration, blades 28 may be pivotally mounted on blocks 30 so that they can be closed like the jaws of a pair of pliers or other similar clamping devices. A cam surface 32 may be provided on each of blades 28 for coacting with a cam surface, not shown, on the opposing faces of each support block 24 for moving edges 36 on the baldes toward each other. A spring 38 may be provided with each blade 28 for automatically opening the blades when support blocks 24 are moved away from the blades after a mitered corner has been formed. One blade 28 in apparatus of the invention is preferably made of a uniformly dense, laminated thermosetting plastic made of various types of filler material such as cotton fabric paper, asbestos, etc. and sold under the trademark Synthane, although it can also be made of other dense plastic material such as nylon or the like. The other blade may be made of metal and have a sharp knife edge on it for cutting elastomeric material in a strip 20 against the Synthane blade as will be described.

In operation of apparatus of the invention, a U-shaped flexible elastomeric strip 20 is positioned over mandrel 10 with the apex of the nose 12 of the mandrel at the point in the strip where the corner is to be formed. Preferably, strip 20 will have been pre-marked where the corner is to be formed. Since strip 20 is flexible, the channel in the strip can be easily opened for positioning of the strip over mandrel 10 with the mandrel in the channel between the legs or flanges 40 on the strip. Strip 20 may be pulled against the mandrel so that the mandrel fits tightly against the inside of the strip, but subsequent movement of the mandrel as will be described should accomplish the same result.

After strip 20 has been positioned on mandrel 10, a switch may be actuated to start a timed sequence of operations of the apparatus. In such timed sequence, mandrel 10 is first moved against support blocks 24 to clamp strip 20 between the edges of the mandrel and the support blocks on the opposite sides of the mandrel as is illustrated in FIG. 3. Grooves 26 in each of support blocks 24 is dimensioned to snugly press flange 40 of strip 20 against mandrel 10 to hold the strip firmly on the mandrel. As restrained on mandrel 10, side flange 40 on strip 20 flares outwardly from the nose of the mandrel at the bend that has been formed in the strip. It will be apparent that the flange on the opposite side of strip 20 will also flare outwardly as has flange 40 which is illustrated. This flaring of flanges 40 facilitates forming a loop in the corner of strip 20 as will now be described.

After strip 20 has been clamped against mandrel 10, blades 28 are partially closed against the excess material at the bend in the strip to form a loop 42 of material therefrom. To effect this partial closing of blades 28, support blocks 18 are moved relative to the blades so that cam surfaces 32 on the blades coact with the cam surfaces on the support blocks to pivot the blades on their mountings. In a preferred embodiment of the invention, relative movement of blades 28 and blocks 24 is produced by moving the blocks against the blades, although the blades could also be moved. When blocks 24 are moved toward blades 28, mandrel 10 must also be moved in the same direction so that strip 20 will remain clamped on the mandrel.

Preferably, the initial closing of blades 28 is controlled so that oppositely facing surfaces on the inside of side flanges 40 of strip 20 are slightly spaced to permit heated air to pass therebetween. As illustrated, the space between the inner surfaces of side flange 40 overlies aperture 16 so that air escaping from such aperture will heat these surfaces. Hot air escaping from aperture 16 is forced against the spaced inner surfaces of side flange 40 of strip to heat the vinyl material in such flange to its softening point, or to a plastic adhesive state, so that the opposing faces may be welded together. Depending on the material from which strip 16 is made and the temperature of the air, the time required for forcing hot air against the opposing surfaces of the strip may vary. In heating a typical vinyl elastic sealing strip for a window assembly, it has been found that forcing air which has been heated to approximately 850°–900° F. against the opposing surfaces of the strip to be welded for approximately 3 seconds will heat the opposing surfaces to the desired plastic adhesive state. After this preselected timed interval for heating the material in the opposing surfaces of flange 40 on strip 20, the supply of hot air is discontinued.

Blades 28 are next further closed by relative movement of blocks 24 with respect to the blades to press the opposing surfaces of side flange 40 on strip 20 together to weld such opposing surfaces, and thereafter sever excess material from the corner of the flange at completion of closing of the blades. Since only the inside surfaces of side flange 40 on strip 20 have been heated to a plastic adhesive state, excess material can be cleanly severed from the corner of the sealing strip and will fall away from the apparatus without sticking to blades 28.

After the excess material has been severed from the corner of strip 20, blades 28 are held in their closed position and cool or cold air is blown against the strip for as long as it takes to cool the elastomeric material in the gasket to a reduced temperature which will permit the blades to be opened without breaking the weld. In one embodiment of the invention, a dwell time of approximately 4 seconds has been found to be adequate for such cooling. The controls are preferably set to automatically time this cooling.

After the weld has been sufficiently cooled, blades 28 are opened by springs 38 when support blocks 24 and mandrel 10 are moved away from the blades, leaving a finished corner in the strip as illustrated in FIG. 6. The finished mitered corner has abutting edges of flanges 40 on the sealing strip welded together and the excess material severed from the flange. Mandrel 10 may then be moved on line away from support blocks 24 so that strip 20 can be removed from the mandrel and another unnotched strip positioned on the mandrel to have a mitered corner formed in it.

It is seen from the above description and the appended drawings that this invention provides apparatus and a method of forming a mitered corner in an elastomeric strip in a relatively short time with little manual assistance. In one embodiment, the entire cycle of forming such a corner can be completed in approximately 8 seconds and requires an operator only for positioning a strip on a mandrel, starting the automatic cycle and removing the strip from the mandrel after a corner has been formed in the strip. Such a cycle requires only a fraction of the time required to form a mitered corner in an elastomeric strip using heretofore known apparatuses and methods.

From the illustrative embodiment and mode of operation has been selected for illustration and description, it will be apparent to those skilled in the art that numerous variations can be made in the apparatus and method without departing from the invention. It will also be apparent to those skilled in the art that various means may be employed for effecting relative movement of the parts which have been illustrated and for controlling the timing and distance of travel of the parts. For example, the mandrel, support blocks and blades may be mounted on known machines which may be adapted to effect the necessary relative movement of the various elements, and either fluidic or electronic means may be provided for controlling such movements. It will also be appreciated by those skilled in the art that the particular shape and nature of the mandrel, clamps and blades which are illustrated are not critical to the invention, nor is the particular shape of the elastomeric strip which is illustrated for practice of the invention. The cycle time required to form a corner may also vary substantially depending on variations in the material and size of the strip in which a corner is formed and the temperature of the air which is used to heat the strip among other factors.

What is claimed is:

1. A method of forming a mitered corner in an elastomeric strip having a longitudinally extending base web and at least one lateral flange disposed at an angle of approximately 90° to the base web along the length thereof comprising the steps of:
    positioning the strip over the angular projecting nose of a mandrel having a thickness approximating the width of the base web of the strip with the base web disposed around the projecting nose of the mandrel and the lateral flange extending outwardly from the face of the mandrel,
    clamping the strip against the edges of the mandrel adjacent its nose on opposite edges thereof including clamping the lateral flange against the face of the mandrel at locations spaced from the apex of the nose of the mandrel to flare the flange outwardly at the bend in the strip overlying the nose of the mandrel with the inside surfaces of the flange on opposite sides of the apex of the mandrel nose substantially facing one another,
    moving the flared portions of the flange on the strip into closely spaced facing relation,
    heating the facing surfaces of the flange to a plastic adhesive state,
    pressing the heated surfaces of the flange tightly together,
    while maintaining the pressure of the surfaces of the flange against one another, cooling the surfaces to weld them together to form a corner in the flange, and
    severing excess material from the flange outwardly of the welded corner.

2. A method as set forth in claim 1 in which the strip has two flanges forming a channel with the base web, and both flanges are welded and cut simultaneously.

3. A method as set forth in claim 1 in which hot air is used to heat the adjacent surfaces of the flange to a plastic adhesive state.

4. A method as set forth in claim 1 in which the elastomeric strip is positioned on a mandrel made of material having a relatively low thermal conductance for welding coincident surfaces of the flange.

5. Apparatus for forming a mitered corner in an elastomeric strip having a longitudinally extending base web and at least one lateral flange disposed at an angle of approximately 90° to the base web along the length thereof comprising:
    a mandrel made of material having a relatively low thermal conductance and including an angular projecting nose with a thickness approximating the width of the base web of the elastomeric strip and an included angle of approximately 120° between the edges of the mandrel on opposite sides of the apex of its nose,
    clamps adapted to be moved toward the opposite edges of the mandrel nose to clamp the base web of an elastomeric strip against said edges and clamp the lateral flange on the strip against the face of the mandrel at locations spaced from the apex of the mandrel nose to flare the flange outwardly at the corner in the strip with the inside surfaces of the flange on opposite sides of the corner substantially facing one another,
    means for directing hot air at said facing surfaces of the flange on the strip to heat them to a plastic adhesive state, and
    a pair of blades adapted to be moved against the outer surfaces of the flared portions of the flange to press the facing surfaces tightly together to weld them and subsequently sever excess material from the flange outwardly of the weld.

6. Apparatus as set forth in claim 5 in which said mandrel is made of a hard-pressed, heavy board made from asbestos and portland cement.

7. Apparatus as set forth in claim 5 in which said mandrel has at least one aperture in its nose for directing hot air at opposing surfaces of a strip which are to be welded.

References Cited
UNITED STATES PATENTS

| 3,668,033 | 6/1972 | Evans | 156—499 |
| 3,649,398 | 3/1972 | Keith | 161—99 |
| 3,488,244 | 1/1970 | Lepisto | 156—311 |
| 2,886,482 | 5/1959 | Huffman | 156—251 |
| 2,794,221 | 6/1957 | Bedics | 156—92 |
| 2,548,251 | 4/1951 | Bergstein | 156—227 |
| 2,533,742 | 12/1950 | Poltorak | 156—217 |
| 2,503,882 | 4/1950 | Medford | 156—155 |
| 2,392,734 | 1/1946 | Haberstump | 156—228 |
| 2,364,962 | 12/1944 | Eagles | 156—228 |
| 1,913,055 | 6/1933 | Keller | 156—217 |

CHARLES E. VAN HORN, Primary Examiner

B. J. LEWRIS, Assistant Examiner

U.S. Cl. X.R.

156—217, 227, 242, 251, 267, 304, 311, 443, 499, 500, 515, 583; 264—339; 425—394